United States Patent [19]

Kriechbaum et al.

[11] Patent Number: 5,011,673

[45] Date of Patent: Apr. 30, 1991

[54] ZIRCONIUM OXIDE POWDER

[75] Inventors: Gangolf Kriechbaum, Freigericht; Peter Kleinschmit, Hanau; Doris Peuckert, Hofheim, all of Fed. Rep. of Germany

[73] Assignee: Degussa Aktiengesellschaft, Fed. Rep. of Germany

[21] Appl. No.: 264,585

[22] Filed: Oct. 31, 1988

[30] Foreign Application Priority Data

Oct. 31, 1987 [DE] Fed. Rep. of Germany ....... 3737064

[51] Int. Cl.$^5$ .............................................. C01G 25/02
[52] U.S. Cl. .................................... 423/608; 501/103; 501/104; 423/266
[58] Field of Search ................ 423/266, 608; 501/103, 501/104

[56] References Cited

U.S. PATENT DOCUMENTS

| | | | |
|---|---|---|---|
| 4,201,594 | 5/1980 | Walters et al. | 501/104 |
| 4,520,114 | 5/1985 | David | 501/103 |
| 4,588,576 | 5/1986 | David | 423/608 |
| 4,619,817 | 10/1986 | Stambaugh et al. | 423/608 |
| 4,722,915 | 2/1988 | Soma et al. | 501/103 |

Primary Examiner—Michael L. Lewis
Assistant Examiner—Ngoc-Yen M. Nguyen
Attorney, Agent, or Firm—Cushman, Darby & Cushman

[57] ABSTRACT

Crystalline zirconium oxide powder with a BET surface of less than 30 m$^2$/g, preferably 10 to 20 m$^2$/g, a primary particle size of 0.1 to 0.5 μm, a monoclinic crystal structure and, optionally, a content of Y$_2$O$_3$ of 1 to 10% by weight and/or of 1 to 10 % by wt. MgO.

It is produced by adding an aqueous zirconium salt solution optionally containing yttrium ions and/or magnesium ions under agitation into a vessel which contains an aqueous base solution such as e.g. sodium hydroxide solution with a content of NaOH which corresponds to an excess of at least 0.5 mole/l NaOH. The mixture obtained in this manner is then treated hydrothermally at a temperature of 200° to 400° C., the product obtained is separated by filtration, washed chloride-free with water and dried at 100° to 200° C.

The zirconium oxide power can be used to produce sintered ceramics.

1 Claim, No Drawings

ZIRCONIUM OXIDE POWDER

The present invention relates to a crystalline zirconium oxide (zirconia) powder which can be used to prepare sintered ceramics.

BACKGROUND OF THE INVENTION

It is known that stabilized zirconium oxide powders can be prepared in a hydrothermal manner (see U.S. Pat. No. 4,619,817).

In that process, an aqueous zirconium salt solution is mixed e.g. with the complexing agent ethylene diamine tetraacetic acid, as well as with stabilizing the elements calcium and/or magnesium and/or yttrium. Subsequently the mixture is titrated with sodium liquor solution to a pH greater than 11.

The mixture, which has a concentration of sodium hydroxide solution of more than 4 moles per liter, is treated in an autoclave hydrothermally at temperatures of about 190° C. The product is tetragonal or cubic zirconium oxide.

According to examples 24 and 25 of U.S. Pat. No. 4,619,817, no complexing agent is added; however, the concentration of sodium hydroxide solution is very low after titration with NaOH with 0.29 mole/l.

The method described in this patent has the following disadvantages:

The addition of a complexing agent brings about a lowering of the pH. This results in the formation of powders with specific surface areas greater than 30 square meters per gram. The resulting very small primary crystallite size leads, during drying of these powders, to the formation of agglomerates. This considerably aggravates or prevents processing in shaping methods which contain a dry or semidry pressing step. The pressing process results in the formation of tensions in the green body and also in the sintered body.

The complexing agent and the decomposition products of the complexing agent cause corrosion, and thus lead to a considerable limitation on the kinds of metallic materials which can be used, and thus to increased costs. The use of a polytetrafluoroethene jacket in the autoclave, as described in the aforesaid U.S. patent, limits the temperature range which can be employed.

Non-homogeneous metal hydroxide precipitates are generated by the titration of the acidic Zr/Y/Mg salt solution with NaOH on account of the fractional precipitation.

The low NaOH concentrations selected in the examples of U.S. Pat. No. 4,619,817, concentrations of < 0.3 mole/liter, and the low pH values associated therewith, lead to the disadvantageous, high specific surface areas described in this patent.

SUMMARY OF THE INVENTION

An object of the present invention is to provide a crystalline zirconium oxide powder with a BET surface of less than 30 m$^2$/g, preferably 10 to 20 m$^2$/g, a primary particle size of 0.1 to 0.5 μm, a monoclinic crystal structure and, optionally, a content of Y$_2$O$_3$ of 1 to 10% by weight and/or of 1 to 10% by wt. MgO.

In a preferred embodiment, the crystalline zirconium oxide powder exhibits a particle size distribution of 90 % between 0.1 and 1 μm.

A further object of the present invention is to provide a method of preparing a crystalline zirconium oxide powder with BET surface of < 30 m$^2$/g, preferably 10 to 20 m$^2$/g, a primary particle size of 0.1 to 0.5 μm, a monoclinic crystal structure and, optionally, a content of Y$_2$O$_3$ of 1 to 10% by wt. and/or of 1 to 10% by wt. MgO.

In accordance with the invention, an aqueous zirconium salt solution, optionally containing yttrium ions and/or magnesium ions, is added with agitation into a vessel containing an aqueous solution of a base, such as e.g. sodium hydroxide solution with a content of NaOH which corresponds to an excess of at least 0.5 mole/l NaOH, and the reaction mixture obtained in this manner is treated hydrothermally (e.g. in an autoclave) at a temperature of 200 to 400° C. The product obtained is filtered off, washed chloride-free with water and dried at 100 to 120° C.

The following can be used as zirconium salts:
ZrOCl$_2$, ZrO(NO$_3$)$_2$, ZrOSO$_4$, Zr(NO$_3$)$_4$, Zr(SO$_4$)$_2$.

The following can be used as yttrium salt:
YCl$_3$, Y(NO$_3$)$_3$, Y acetate.

The following can be used as magnesium salts:
MgCl$_2$, Mg(NO$_3$)$_2$, MgSO$_4$, Mg acetate.

NaOH, KOH and/or LiOH can be used as the base.

An excess amount of base remains when the acidic portion of the zirconium salt solution is neutralized by the base.

The crystalline zirconium oxide powder of the invention can be used to produce sintered ceramics.

A phase conversion into the tetragonal or cubic form occurs during the sintering process as a function of the sintering temperature.

DESCRIPTION DESCRIPTION OF PREFERRED EMBODIMENTS

The following examples illustrate the invention:

EXAMPLE 1

500 ml of a solution of ZrOCl$_2$ in H$_2$O (1 mole ZrO) is added dropwise with agitation into a vessel containing a solution of 120 g NaOH in 450 ml H$_2$O.

The hydroxide suspension produced in this manner is transferred into a 2 liter agitated autoclave and heated with agitation over 40 minutes to a temperature of 300° C.

After a reaction time of 2 hours, the reaction mixture is cooled down to approximately 80° C. The reaction mixture is filtered and the filter cake produced is washed with water until no more chloride ion can be detected in the wash water.

The filter cake is dried for 24 hours at 105° C. The ZrO$_2$ powder produced has a specific surface of 15 m$^2$, an annealing loss of 1.57% (1000° C./2 h) and a d$_{50}$ value of 0.28 μm.

EXAMPLE 2

The same procedure is used as in Example I. The specific conditions are listed in Table 1.

EXAMPLE 3

The same procedure is used as in Example 1. The specific conditions are listed in Table 1.

EXAMPLE 4

102 liters of a solution of YCl3, (13.5 g Y203/1) and ZrOCl$_2$ (245.1 g ZrO$_2$/l) are added at 45° C. with agitation to 150 liters of a NaOH solution (203.3 g NaOH/liter).

The viscous suspension produced is transferred after 45 minutes into a 250 liter agitated autoclave, heated to 250° C. and maintained at this temperature for 3 hours with agitation.

After the suspension has cooled off, it is filtered off and the filter cake produced is washed with water until no chloride ion can be detected in the wash water.

The filter cake is dried for 24 hours at 105° C. The $ZrO_2$ powder has a specific surface of 15 m²/g, an annealing loss of 1.52% and a $D_{50}$ value of 0.6 μm.

EXAMPLE 5

The same procedure is used as in Example 4. The specific conditions are listed in Table 1.

EXAMPLE 6

The same procedure is used as in Example 4. The specific conditions are listed in Table 1.

EXAMPLE 7

The same procedure is used as in Example 4. However, washing is performed after the hydroxide precipitation until the wash water is free of $Cl^-$. A hydrothermal treatment is then used.

Determination of the product qualities

BET surface area

The powders are dried for 15 hours at 100° C. and subsequently rinsed 20 minutes at 150° C. with $N_2$. The measurement is performed with an aerometer of the Strohlein firm. Grain distribution The powders are suspended in $H_2O$ and dispersed with a 3 minute treatment with ultrasound. The measurement is performed with a centrifuge of the Alpine firm. Sintering results The sintering tests are carried out on axially pressed green bodies (amount of pressure applied 1 t/m²). The sintering density is determined by buoyancy. The sintering temperatures are 1400° C., holding time 2 hours.

What is claimed is:

1. Crystalline zirconium oxide powder with a BET surface area in the range of 10 to 20 m²/g, a primary particle size of 0.1 to 0.5 μm consisting essentially of and a monoclinic crystal structure, and a content of $Y_2O_3$ of 1 to 10% by weight and/or 1 to 10% by weight MgO coprecipitated with the zirconium dioxide, wherein the crystalline zirconium oxide powder exhibits a particle size distribution of 90% between 0.1 and 1 μm.

* * * * *

TABLE 1

| Example | $ZrO_2$ Mol/l | $Cl^-$ Mol/l | MgO (%) relative to $ZrO_2$2 | $Y_2O_3$ (%) relative to $ZrO_2$2 | Excess NaOH (mole/l) | $NH_3$ (mole/l) | Temp. °C. | Time (hours) |
|---|---|---|---|---|---|---|---|---|
| 1 | 1 | 2 | — | — | 1 | — | 300 | 2 |
| 2 | 1 | 2 | — | — | 1 | — | 250 | 17 |
| 3 | 1 | — | — | — | — | 15 | 270 | 3 |
| 4 | 0.81 | 1.62 | — | 5.3 | 1 | — | 250 | 3 |
| 5 | 0.81 | 1.62 | — | 5.3 | 0.01[2] | — | 250 | 4 |
| 6[5] | 0.81 | 1.62 | — | 5.3 | 0.3 | — | 300 | 5 |
| 7 | 0.81 | — | 3 | — | 0.5 | — | 300 | 3 |

| Example | BET (m²/g) | Annealing Loss (TEM)[6] (NM) 1 × b | Crystallite size | $d_{10}$, $d_{50}$, $d_{90}$ (μm) | sinter density | X-ray[6] phase |
|---|---|---|---|---|---|---|
| 1 | 15 | 1.57 | 200 × 100 | 0.18, 0.28, 0.48 | — | m |
| 2 | 14 | 1.47 | 200 × 100 | 0.20, 0.34, 0.63 | — | m |
| 3 | 89 | 2.25 | <10 | 0.14, 1.07, >10 | — | c |
| 4 | 15 | 1.52 | 200 × 100 | 0.3, 0.62, 5[1] | 5.97 | m |
| 5 | 142 | 6.2 | <10 | >10 | 5.17 | c |
| 6[5] | 22 | 1.1 | 200 × 80 | 0.13, 0.21, 1.0 | 6.04[3] | m |
| 7 | 25 | 1.7 | 60 × 20 | 0.27, 0.62, 1.5 | — | m |

[footnotes]:
[1]measurement with granulometer
[2]pH = 8.4
[3]sintering temperature 150° C.
[4]m = monoclinic
c = cubic or tetragonal
[5]sintered body exhibits fissures
[6]TEM = transmission electronic microscopy